United States Patent [19]

Okano et al.

[11] Patent Number: 5,475,079
[45] Date of Patent: Dec. 12, 1995

[54] (CO) POLYCARBONATE COMPOSITION AND PROCESS FOR PREPARING THE SAME

[75] Inventors: Yoshimichi Okano; Michiyo Tanigawa; Yutaka Fukuda, all of Hyogo, Japan

[73] Assignee: Daicel Chemical Industries, Ltd., Osaka, Japan

[21] Appl. No.: 228,283

[22] Filed: Apr. 15, 1994

[30] Foreign Application Priority Data

Apr. 28, 1993 [JP] Japan ................................. 5-10220
Apr. 28, 1993 [JP] Japan ................................. 5-102281
Jul. 7, 1993 [JP] Japan ................................. 5-167661
Jul. 7, 1993 [JP] Japan ................................. 5-167662

[51] Int. Cl.$^6$ ................................................ C08G 64/00
[52] U.S. Cl. ........................ 528/198; 528/171; 528/174; 528/176; 528/179; 528/182; 528/196
[58] Field of Search ........................... 528/198, 196, 528/171, 174, 176, 179, 182

[56] References Cited

U.S. PATENT DOCUMENTS 4,948,871  8/1990  Fukuoka et al. ..................... 528/481
5,142,018  8/1992  Sakashita et al. ................... 528/199

Primary Examiner—James J. Seidleck
Assistant Examiner—Terressa Mosley
Attorney, Agent, or Firm—Flynn, Thiel, Boutell & Tanis

[57] ABSTRACT

A (co)polycarbonate composition mainly comprising a (co)polycarbonate having a limiting viscosity number [η] of 0.2 to 1.0 dl/g and terminal hydroxyl groups in an amount of 20 mole % or below, based on all the terminal groups of the (co)polycarbonate, and is substantially free from any branched structure which might otherwise be formed by a side reaction. The (co)polycarbonate contains chlorine (causative of discoloration) in an amount of 10 ppm or below and an alkali metal ion and/or an alkaline earth metal ion in an amount of 1 ppm or below. A process for preparing the above (co)polycarbonate composition by the melt transesterification process involves the reaction of a dihydroxy compound such as bisphenol A and a carbonic diester such as diphenyl carbonate with a nitrogen-containing basic compound (a), and/or, a compound (b) containing an element selected from the group consisting of elements belonging to Groups I, II, IV and V of the periodic table as a catalyst.

18 Claims, No Drawings

(CO) POLYCARBONATE COMPOSITION AND PROCESS FOR PREPARING THE SAME

BACKGROUND OF THE INVENTION

1. Field of the Invention

The present invention relates to a (co)polycarbonate composition mainly comprising a (co)polycarbonate and a process for preparation thereof. More particularly, the present invention relates to a discoloration-free, chlorine-free (co)polycarbonate composition mainly comprising a heat-resistant, linear (co)polycarbonate which is free from any branched structure which might be formed by a side reaction during polycondensation, and a process for preparation thereof, and another (co)polycarbonate composition mainly comprising a heat-resistant, branched (co)polycarbonate which does not contain chlorine causative of discoloration and is suitable for the production of a hollow molding, and an efficient process for preparation thereof.

2. Description of the Related Art

A high-molecular-weight polycarbonate is a general-purpose engineering thermoplastic which is useful in various fields, particularly as an injection molding material or a sheet material substituting for a window pane.

A polycarbonate is prepared by the interfacial polycondensation process (i.e., the phosgene process) which comprises adding a solvent such as methylene chloride to an aqueous solution or suspension of a sodium salt of a dihydric phenol and blowing phosgene into the obtained system to conduct a reaction, or by the transesterification process which comprises heat-melting a dihydric phenol and a carbonic diester such as diphenyl carbonate and conducting the polycondensation thereof through transesterification at a high temperature and under a reduced pressure.

Among the above processes, the interfacial polycondensation process is generally widely utilized. However, according to this process, not only the use of highly toxic phosgene is necessitated, but also chlorine remains in a reaction product mainly comprising a produced polycarbonate. When chlorine remains in the reaction product mainly comprising a polycarbonate, the reaction product discolors during the molding thereof at high temperatures. Accordingly, the obtained reaction product must be washed to lower the residual chlorine concentration.

On the other hand, the transesterification process has advantages in that the use of highly toxic phosgene is not necessitated and that the provision of a step of removing residual chlorine is unnecessary. The transesterification process is generally effected in the presence of a catalyst and at a high temperature under reduced pressure. As catalysts useful for the preparation of a polycarbonate by the transesterification process, alkali metal compounds and alkaline earth metal compounds are well known. However, these compounds are known to cause side reactions leading to a branched structure through the Kolbe-Schmitt reaction or the formation of an isoalkenylphenol [see L. Bottenbruch, Encyclopedia of Polymer Science and Technology, 10, 722 (1969)]. Accordingly, when the transesterification process is conducted by the use of the above catalyst for the purpose of preparing a high-molecular-weight polycarbonate, a branched structure is formed by the side reaction, so that the product obtained under certain reaction conditions is partially insoluble in a solvent such as methylene chloride, and/or, is significantly discolored.

Meanwhile, since polycarbonates of the prior art exhibited Newtonian fluid characteristics in a molten state, the molding thereof into a hollow article was difficult. It has been known that the melt viscosity of a polycarbonate under a high shear rate decreases and that under a low shear rate increases by imparting a branched structure to the polycarbonate [see D. FREITAG et al., Encyclopedia of Polymer Science and Engineering, 11, 660 (1988)]. Therefore, the moldability of a polycarbonate into a hollow article can be improved by utilizing this fact. Thus, it is a practice to impart a branched structure to a polycarbonate by using a polyfunctional organic compound having at least three functional groups as a branching agent in the preparation of a polycarbonate.

For example, in U.S. Pat. Nos. 5,104,964 (assignee: IDEMITSU PETROCHEM K.K.; date of patent: Apr. 14, 1992) and 5,283,314 (assignee: IDEMITSU PETROCHEM K.K.; date of patent: Feb. 1, 1994), a branched polycarbonate is prepared by using a polyfunctional organic compound having at least three Functional groups as a branching agent in the preparation of a polycarbonate by the interfacial polycondensation process (i.e., the phosgene process), which comprises adding a solvent such as methylene chloride to an aqueous solution or a suspension of a sodium salt of a dihydric phenol and blowing phosgene thereinto. Although the branched polycarbonate thus prepared is improved in its moldability, not only does this process necessitate the use of highly toxic phosgene, but also chlorine remains in a reaction product mainly comprising a produced polycarbonate. When chlorine remains in the reaction product mainly comprising a polycarbonate, the reaction product mainly comprising a polycarbonate discolors during in the molding thereof at high temperatures. Accordingly, a step of washing the obtained reaction product is necessitated to lower the residual chlorine concentration.

As described above, there is known, besides the interfacial polycondensation process, the melt transesterification process which comprises heat-melting a dihydric phenol and a carbonic diester, such as diphenyl carbonate, and conducting the polycondensation through transesterification at a high temperature and under a reduced pressure, as a process for preparing a polycarbonate. The transesterification process has advantages in that the use of highly toxic phosgene is not necessitated and that it can dispense with the step of removing residual chlorine, and thus is a remarkably effective process for preparing a polycarbonate composition free from chlorine causative of discoloration.

However, the polycarbonate composition (or reaction product) prepared by the transesterification process is also contaminated with impurities causative of discoloration and the like. To overcome this problem, it is proposed in Japanese Patent Publication-A No. 4-100824 (published on Apr. 4, 1992) to use a diaryl carbonate having a xanthone content of 10 ppm or below. Although the use of such a carbonate can give a relatively light-colored polycarbonate, it has a problem in that the obtained polycarbonate is somewhat yellows as compared with that prepared by the phosgene process.

In the preparation of a polycarbonate by a transesterification process, the polycondensation is generally effected in the presence of a catalyst at high temperature under reduced pressure. As catalysts and which have a high activity and are useful for the preparation of a polycarbonate by the transesterification process, alkali metal compounds and alkaline earth metal compounds are well known. When a process using an alkali metal compound or an alkaline earth metal compound as a catalyst, among the transesterification processes for the preparation of a polycarbonate, is conducted at a high temperature, branched structures by the Kolbe-Schmitt reaction and/or through the formation of an isoalkenylphenol are formed [see L. Bottenbruch, Encyclopedia of Polymer Science and Technology. 10, 722 (1969)] as described above. However, the formation of branched structures by such side reactions are very difficult to control and the obtained polycarbonates exhibit extremely poor physical properties, because a structure different from that inherent in polycarbonate is incorporated into the polycarbonate by the formation of a branched structure. Further, the formation of branched structures by the above side reactions are closely connected with the discoloration of a polycarbonate (composition).

As described above, the formation of a high-molecular-weight polycarbonate which is free from discoloration by the transesterification process is generally difficult unlike by the interfacial polycondensation process.

To overcome the problems described above, many compounds have hitherto been proposed as transesterification catalysts. A process for the preparation of a polycarbonate using a catalyst system comprising a combination of a specific nitrogen-containing basic compound, i.e., quaternary ammonium hydroxide, with a borate is proposed, for example, in U.S. Pat. No. 4,590,257 (date of patent: May 20, 1986, assignee: General Electric), and a relatively light-colored polycarbonate composition can be obtained with the use of this catalyst. However, it has a problem that much time is necessary to give a high-molecular-weight polycarbonate since the activity of this catalyst is low.

Furthermore, it has also been known that a boron compound such as boric acid and triphenylborate is useful to prevent the discoloration of the polycarbonate [see U.S. Pat. Nos. 3442854 (assignee: FARBENFAB BAYER AG), 4590257 (assignee: GENERAL ELECTRIC CO.: date of patent: May 20, 1986) and 5276109 (assignee: GENERAL ELECTRIC CO.; date of patent: Jan. 4, 1994), and European Patent Publication-A Nos. 351168 (published on Jan. 17, 1990) and 435124 (published on Jul. 3, 1991)]. However, the use of the boron compound sometimes brings about other problem(s).

Accordingly, an object of the present invention is to provide a discoloration-Free and chlorine (which is causative of discoloration) Free (co)polycarbonate composition mainly comprising a high-molecular-weight, linear (co)polycarbonate which is free from any branched structure which might be formed by a side reaction and has excellent heat stability, and a process for the preparation thereof.

Another object of the present invention is to provide a (co)polycarbonate composition mainly comprising a heat-stable (co)polycarbonate having a branched structure formed not by a side reaction but by using a polyfunctional organic compound having at least three functional groups as a branching agent, which is useful for the production of a hollow molding, is not discolored and is free from chlorine causative of discoloration, and a process for the preparation thereof.

DISCLOSURE OF THE INVENTION

Summary of the Invention

The present inventors have extensively studied to attain the above objects and, as a result, they have found that in the preparation of a (co)polycarbonate by the transesterification process, a side reaction forming a branched structure can be inhibited by selecting the catalyst to be used and the reaction conditions to be employed. Further, they have made detailed studies to find a process for protecting a (co)polycarbonate composition mainly comprising a (co)polycarbonate from discoloration in molding and for preventing a (co)polycarbonate from lowering in its molecular weight its molding. The present invention has been accomplished on the basis of these findings.

Accordingly, the present invention provides a (co)polycarbonate composition mainly comprising or consisting essentially of a (co)polycarbonate, which contains chlorine in an amount of 10 ppm or below, preferably 7 ppm or below, still preferably 5 ppm or below, and an alkali metal ion and/or an alkaline earth metal ion in an amount of 1 ppm or below. Examples of the (co)polycarbonate composition described above include a reaction product (or reaction mixture), one obtained by treating, e.g., washing, a reaction product, one obtained by adding an additive to a reaction product or the like. The (co)polycarbonate means polycarbonate (homopolymer), copolycarbonate (copolymer) and copolyester carbonate (copolymer).

The (co)polycarbonate preferably has a limiting viscosity number $[\eta]$ of 0.2 to 1.0 dl/g and terminal hydroxyl groups in an amount of 20 mole % or below based on all the terminal groups of the (co)polycarbonate. The limiting viscosity number $[\eta]$ of a (co)polycarbonate is determined with a solution of a (co)polycarbonate composition mainly comprising or consisting essentially of a (co)polycarbonate in methylene chloride at 20° C.

When the (co)polycarbonate has a branching parameter $G=[\eta]/[\eta]_{lin}$ of 0.8 to 1.0, especially exceeding 0.9 and up to 1.0, the (co)polycarbonate is substantially linear. When the (co)polycarbonate has a branching parameter $G=[\eta]/[\eta]_{lin}$ of 0.1 to 0.9, the (co)polycarbonate is substantially branched. In this specification, $[\eta]$ is the limiting viscosity number of a test (co)polycarbonate determined as described above and $[\eta]_{lin}$ is the limiting viscosity number, determined as described above, of a linear (co)polycarbonate having a weight-average molecular weight, which is determined by the light scattering method or the GPC method using a universal calibration curve, equal to that off the test (co)polycarbonate.

The (co)polycarbonate composition according to the present invention is preferably prepared from a dihydroxy compound and a carbonic diester by a melt transesterification process.

The carbonic diester as a starting monomer of the (co)polycarbonate according to the present invention advantageously satisfies at least one factor selected from the group consisting of:

(factor-1) the carbonic diester is substantially free from phenyl salicylate, o-phenoxybenzoic acid and phenyl o-phenoxybenzoate, i.e., the carbonic diester contains 50 ppm or below of a sum of phenyl salicylate, o-phenoxybenzoic acid and phenyl o-phenoxybenzoate, (factor-2) the carbonic diester is substantially free from tin ion, i.e., the carbonic diester contains 5 ppm or below of tin ion, and (factor-3) the carbonic diester is substantially free from methyl phenyl carbonate, i.e., the carbonic diester contains 50 ppm or below of methyl phenyl carbonate.

The carbonic diester is preferably one satisfying any of the following conditions:

(1) the carbonic diester contains copper ion in an amount of 1 ppm or below and phosphorus ion in an amount of 20 ppm or below, (2) the carbonic diester contains water in an amount of 0.84 by weight or below, chlorine in an amount of 5 ppm or below, sodium ion in an amount of 1 ppm or below and iron ion in an amount of 1 ppm or below, (3) the carbonic diester contains water in an amount of 0.34 by weight or below, chlorine in an amount of from above 8 to 5 ppm, sodium ion in an amount of 1 ppm or below and iron ion in an amount of 1 ppm or below, (4) the carbonic diester contains water in an amount of 0.3% by weight or below, chlorine in an amount of from 3.3 to 5 ppm, sodium ion in an amount of 1 ppm or below and iron ion in an amount of 1 ppm or below, and (5) the carbonic diester contains water in an amount of 0.3% by weight or below, chlorine in an amount of from above 4 to 5 ppm, sodium ion in an amount of 1 ppm or below and iron ion in an amount of 1 ppm or below.

The measuring methods of the water, chlorine and ions described above will be described in the Examples.

When the (co)polycarbonate according to the present invention is branched, the (co)polycarbonate is preferably prepared from a dihydroxy compound and a carbonic diester in the presence of a polyfunctional organic compound having at least three functional groups as a branching agent in an amount of 0.05 to 2% by mole based on the amount of the dihydroxy compound by a melt transesterification process.

The present invention includes:

(1) a linear polycarbonate which has a limiting viscosity number [η] of 0.2 to 1.0 dl/g as determined in methylene chloride at 20° C. a branching parameter G= $[\eta]/[\eta]_{lin}$ [wherein $[\eta]_{lin}$ is the limiting viscosity number of a linear polycarbonate having the same weight-average molecular weight as that of the test polycarbonate (as determined by the light scattering method or the GPC method using a universal calibration curve) as determined in methylene chloride at 20° C.] of 0.8 to 1.0, a chlorine concentration in the polycarbonate of 10 ppm or below, a terminal hydroxyl content of 20 mole % or below based on the whole terminals and an alkali ion concentration and alkaline earth metal ion concentration of 1 ppm or below, and (2) a branched polycarbonate which has a limiting viscosity number [η] of 0.2 to 1.0 dl/g as determined in methylene chloride at 20° C., a branching parameter G= $[\eta]/[\eta]_{lin}$ [wherein $[\eta]_{lin}$ is the limiting viscosity number of a linear polycarbonate having the same weight-average molecular weight as that of the test polycarbonate (as determined by the light scattering method or the GPC method using a universal calibration curve) as determined in methylene chloride at 20° C.] of 0.1 to 0.9, a chlorine concentration in the polycarbonate of 10 ppm or below, a terminal hydroxyl content of 20 mole % or below based on the whole terminals and an alkali ion concentration and alkaline earth metal ion concentration of 1 ppm or below.

Furthermore, the present invention provides a process for preparing a (co)polycarbonate composition mainly comprising or consisting essentially of a (co)polycarbonate from a dihydroxy compound and a carbonic diester by a melt transesterification process, which comprises using a nitrogen-containing basic compound (a) and/or a compound (b) containing an element selected from the group consisting of elements belonging to Groups I, II, IV and V of the periodic table as a transesterification catalyst.

As the catalyst, a compound (b') containing an element selected from the group consisting of elements belonging to Groups I, IIa, IVa and Va of the periodic table is preferably used.

When a branched (co)polycarbonate is an objective one, the melt transesterification is effected in the presence of a polyfunctional organic compound having at least three functional groups as a branching agent in an amount of 0.05 to 2% by mole based on the amount of the dihydroxy compound.

The melt transesterification is advantageously effected in the presence of at least one compound selected from the group consisting of compounds represented by the following general formulae (I) or (II):

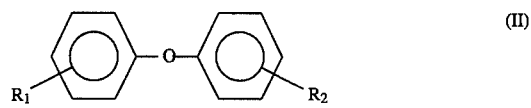

wherein $R_1$ and $R_2$ are each a hydrogen atom or a linear or branched alkyl group having 1 to 8 carbon atoms.

The melt transesterification is advantageously effected in the absence of the compound represented by the above general formulae (I) or (II) when an alkali metal compound or an alkaline earth metal compound as a catalyst is not used.

The melt transesterification is effected in the presence of preferably at least one compound selected from the group consisting of a boric acid, a borate and ammonium hydrogenphosphite, and still preferably a boric acid and/or a borate.

In the process according to the present invention, the carbonic diester satisfying at least one factor selected from the group consisting of:

(factor-1) the carbonic diester is substantially free from phenyl salicylate, o-phenoxybenzoic acid and phenyl o-phenoxybenzoate, i.e., the carbonic diester contains 50 ppm or below of a sum of phenyl salicylate, o-phenoxybenzoic acid and phenyl o-phenoxybenzoate, (factor-2) the carbonic diester is substantially free from tin ion, i.e., the carbonic diester contains 5 ppm or below of tin ion, and (factor-3) the carbonic diester is substantially free from methyl phenyl carbonate, i.e., the carbonic diester contains 50 ppm or below of methyl phenyl carbonate, is advantageously used as a starting monomer.

The carbonic diester used in the process according to the present invention is preferably one further satisfying any of the following conditions:

(1) the carbonic diester contains copper ion in an amount of 1 ppm or below and phosphorus ion in an amount of 20 ppm or below, (2) the carbonic diester contains water in an amount of 0.3% by weight or below, chlorine in an amount of 5 ppm or below, sodium ion in an amount of 1 ppm or below and iron ion in an amount of 1 ppm or below, (3) the carbonic diester contains water in an amount of 0.3% by weight or below, chlorine in an amount of from above 3 to 5 ppm, sodium ion in an amount of 1 ppm or below and iron ion in an amount of 1 ppm or below, (4) the carbonic diester contains water in an amount of 0.3% by weight or below, chlorine in an amount of from 3.3 to 5 ppm, sodium ion in an amount of 1 ppm or below and iron ion in an amount of 1 ppm or below, and (5) the carbonic diester contains water in an amount of 0.3% by weight or below, chlorine in an amount of from above 4 to 5 ppm, sodium ion in an amount of 1 ppm or below and iron ion in an amount of 1 ppm or below.

The process according to the present invention includes:

(1) a process for the preparation of a linear polycarbonate according to the present invention characterized in that in the preparation of the polycarbonate from a dihydric phenol and a carbonic diester by the melt transesterification process, a nitrogen-containing basic compound and/or at least one compound containing an element selected from among Group I, II, IV and V of the periodic table is(are) used as a catalyst(s), and (2) a process for the preparation of a branched polycarbonate according to the present invention characterized in that in the preparation of the polycarbonate from a dihydric phenol and a carbonic diester by the melt transesterification process, a nitrogen-containing basic compound and/or at least one compound containing an element selected from among Group I, II, IV and V of the periodic table is(are) used as a catalyst(s).

Further scope and applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

The present invention will now be described in detail.

The (co)polycarbonate composition of the present invention contains chlorine in an amount of 10 ppm or below, preferably 7 ppm or below, still preferably 5 ppm or below. When the (co)polycarbonate composition contains chlorine in an amount of exceeding 10 ppm, the (co)polycarbonate composition is sometimes significantly discolored in the molding thereof.

The (co)polycarbonate composition of the present invention contains an alkali metal ion and/or an alkaline earth metal ion in an amount of 1 ppm or below. That is, the total amount of alkali metal ions and alkaline earth metal ions in the (co)polycarbonate composition is 1 ppm or below. When the (co)polycarbonate composition contains an alkali metal ion and/or an alkaline earth metal ion in an amount exceeding 1 ppm, generally the amount of the alkali metal catalyst and/or the alkaline earth metal catalyst used is surplus, which brings about the formation of a branched structure due to a side reaction (which is different from the desired branched structure when the (co)polycarbonate is a branched one). Further, when the (co)polycarbonate composition contains an alkali metal ion and/or an alkaline earth metal ion in an amount of exceeding 1 ppm, the (co)polycarbonate composition is sometimes significantly discolored.

The (co)polycarbonate according to the present invention has a limiting viscosity number $[\eta]$ of 0.2 to 1.0 dl/g. A (co)polycarbonate having a limiting viscosity number $[\eta]$ of less than 0.2 dl/g will be poor in impact resistance, while one having a limiting viscosity number $[\eta]$ exceeding 1.0 dl/g will be difficult to mold because of too high a molecular weight thereof.

The (co)polycarbonate according to the present invention has terminal hydroxyl groups in an amount of 20 mole % or below based on all the terminal groups of the (co)polycarbonate. When the (co)polycarbonate has terminal hydroxyl groups in an amount exceeding 20 mole %, the (co)polycarbonate is liable to discolor during in the molding thereof at a high temperature and to lower in its molecular weight.

The (co)polycarbonate according to the present invention has a branching parameter G of 0.1 to 1.0. The linear (co)polycarbonate according to the present invention has a branching parameter G of 0.8 to 1.0, preferably exceeding 0.9 to 1.0. The branched (co)polycarbonate according to the present invention has a branching parameter G of 0.1 to 0.9, preferably 0.2 to 0.9.

The "branching parameter G" used in the present invention is defined to be the ratio of the limiting viscosity number $[\eta]$ of a (co)polycarbonate prepared, i.e., a test (co)polycarbonate, to that $[\eta]_{lin}$ of a linear (co)polycarbonate having a weight-average molecular weight equal to that of the above (co)polycarbonate, i.e., by $G=[\eta]/[\eta]_{lin}$. When the dihydroxy compound as a starting monomer is bisphenol A, the limiting viscosity number $[\eta]_{lin}$ was calculated based on the Schultz viscosity equation: $[\eta]=0.11\times10^{-4} Mw^{0.82}$ (wherein Mw represents a weight-average molecular weight), assuming that the molecular weight distribution obeys the Schultz-Zimm exponential distribution. With respect to a copolymer prepared with bisphenol A and another dihydroxy compound, and a homopolymer prepared with another dihydroxy compound, a viscosity equation was determined from the limiting viscosity numbers and weight-average molecular weights of linear (co)polycarbonates prepared by the interfacial polycondensation process and the branching parameter G was calculated based on the viscosity equation in the same manner as that described above. The weight-average molecular weight (Mw) can also be determined by the GPC method using a universal calibration curve as well as the light scattering method and the influence due to a difference in the method of measurement was within experimental error.

Taking into account the fact that a (co)polycarbonate having a branching parameter G of 0.8 to 1.0 generally behaves as a Newtonian fluid in a molten state, and the experimental error in measuring the weight-average molecular weight and the experimental error and the influence of the molecular weight distribution in measuring the limiting viscosity number, a polycarbonate having a branching parameter of 0.8 to 1.0 is concluded to be substantially free from any branched structure (i.e., to be linear). The linear (co)polycarbonate is preferably one having a branching parameter G of exceeding 0.9 and up to 1.0 and such a linear (co)polycarbonate is not suitable for preparing a hollow molding.

When it is inteded to prepare a linear (co)polycarbonate and the resultant (co)polycarbonate has a branching parameter G of below 0.8, such a (co)polycarbonate is regarded to have, substantially, a branched structure due to a side reaction, i.e., the structure of the resultant (co)polycarbonate is different from its inherent structure, even in consideration of the experimental error in measuring the weight-average molecular weight and the experimental error and the influence of the molecular weight distribution in measuring the limiting viscosity number. Such a (co)polycarbonate generally has decreased physical properties.

When it is intended to prepare a branched (co)polycarbonate with the use of a branching agent and the resultant (co)polycarbonate has a branching parameter G of 0.1 to 0.9, such a (co)polycarbonate generally exhibits a pronounced behavior as a non-Newtonian fluid in a molten state though the effect depends on the molecular weight, and is regarded to have, substantially, a branched structure even in consideration of the experimental error in measuring the weight-average molecular weight and the experimental error and the influence of the molecular weight distribution in measuring the limiting viscosity number. Such a branched (co)polycarbonate is suitable for preparing a hollow molding.

A (co)polycarbonate having a branching parameter G of below 0.1 is a product resulting from the undesirable phenomenon that (co)polycarbonate prepolymers are crosslinked with each other during polycondensation, thus being unfavorable.

The process according to the present invention is useful as the process for preparing the (co)polycarbonate composition mainly comprising a heat-stable (co)polycarbonate according to the present invention. According to this process, no branched structure due to a side reaction will be formed. When no branching agent is used, a linear (co)polycarbonate will be obtained. On the other hand, when a branching agent is used, a branched (co)polycarbonate will be obtained.

Next, the starting materials, catalysts and other materials to be used in the process of the present invention will be described.

Among dihydroxy compounds to be used in the present invention, bisphenol A [i.e., 2,2-bis(4-hydroxyphenyl)propane] is generally used, and, in addition, for example, bis(hydroxyaryl)alkanes such as bis(4-hydroxyphenyl)methane, 1,1-bis(4-hydroxyphenyl)ethane, 2,2-bis(4-hydroxyphenyl)butane, 2,2-bis(4-hydroxyphenyl)-4-methylpentane, 2,2-bis-(4-hydroxyphenyl)octane. bis(4-hydroxyphenyl)phenylmethane, 4,4'-dihydroxy-2,2,2-triphenylethane, 2,2-bis-(3-bromo-4-hydroxyphenyl)propane, 2,2-bis(3,5-dibromo-4-hydroxyphenyl)propane, 1,1-bis(4-hydroxy-3-methylphenyl)propane, 2,2-bis(4-hydroxy-3-methylphenyl)propane, 2,2-bis(4-hydroxy-3-isopropylphenyl)propane, 2,2-bis(4-hydroxy-3-sec.-butylphenyl)propane, 2,2-bis(3,5-dimethyl-4-hydroxyphenyl)propane and 1,1-bis(4-hydroxy-3-tert-butylphenyl)propane; bis-(hydroxyaryl)arenes such as 1,1-bis(4-hydroxyphenyl)-p-diisopropylbenzene. 1,1-bis(4-hydroxyphenyl)-p-diethylbenzene and 1,1-bis(4-hydroxyphenyl)-m-diisopropylbenzene; bis(hydroxyaryl)cycloalkanes such as 1,1-bis(4-hydroxyphenyl)cyclopentane, 1,1-bis(4-hydroxyphenyl)cyclohexane and 1,1-bis(4-hydroxyphenyl)cyclooctane; dihydroxydiaryl ethers such as 4,4'-dihydroxydiphenyl ether and 4,4'-dihydroxy-3,3'-dimethyldiphenyl ether; dihydroxydiaryl sulfides such as 4,4'-dihydroxydiphenyl sulfide and 4,4'-dihydroxy-3,3'-dimethyldiphenyl sulfide; dihydroxydiaryl sulfoxides such as 4,4'-dihydroxydiphenyl sulfoxide and 4,4'-dihydroxy-8,3'-dimethyldiphenyl sulfoxide; and dihydroxydiaryl sulfones such as 4,4'-dihydroxydiphenyl sulfone and 4,4'-dihydroxy-3,3'-dimethyldiphenyl sulfone can be used. These dihydroxy compounds may be used alone or as a mixture of two or more of them.

As the carbonic diester to be used in the present invention, for example, diphenyl carbonate, ditolyl carbonate, bis(chlorophenyl) carbonate, m-cresyl carbonate, dinaphthyl carbonate, dicyclohexyl carbonate, dimethyl carbonate, diethyl carbonate and dibutyl carbonate can be used. Among these carbonic diesters, diphenyl carbonate is generally used. These carbonic diesters may be used alone or as a mixture of two or more of them.

The carbonic diester to be used in the present invention preferably satisfies at least one factor selected from the group consisting of:

(factor-1) the carbonic diester is substantially free From phenyl salicylate, o-phenoxybenzoic acid and phenyl o-phenoxybenzoate, (factor-2) the carbonic diester is substantially free from tin ion, and (factor-3) the carbonic diester is substantially free From methyl phenyl carbonate.

That is, the carbonic diester contains 50 ppm or below of a sum of phenyl salicylate, o-phenoxybenzoic acid and phenyl o-phenoxybenzoate, 5 ppm or below of tin ion, and/or, 50 ppm or below of methyl phenyl carbonate.

The impurities described above affect the hue and heat-resistance of the resulting (co)polycarbonate composition mainly comprising a (co)polycarbonate, i.e., the reaction product.

Further preferred examples of the carbonic diester to be used in the present invention include (1) those containing copper ion in an amount of 1 ppm or below and phosphorus ion in an amount of 20 ppm or below, (2) those containing water in an amount of by weight or below, chlorine in an amount of S ppm or below, sodium ion in an amount of 1 ppm or below and iron ion in an amount of 1 ppm or below, (3) those containing water in an amount of 0.3% by weight or below, chlorine in an amount of from above 3 to 5 ppm, sodium ion in an amount of 1 ppm or below and iron ion in an amount of 1 ppm or below, (4) those containing water in an amount of 0.3% by weight or below, chlorine in an amount of from 3.3 to 5 ppm, sodium ion in an amount of 1 ppm or below and iron ion in an amount of 1 ppm or below, and (5) those containing water in an amount of 0.3% by weight or below, chlorine in an amount of from above 4 to 5 ppm, sodium ion in an amount off 1 ppm or below and iron ion in an amount of 1 ppm or below. When a carbonic diester not satisfying these requirements other than the water content is used, the resulting (co)polycarbonate composition mainly comprising a (co)polycarbonate may be significantly discolored and the (co)polycarbonate have poor properties, particularly in heat stability. When the carbonic diester has a water content exceeding 0.3% by weight, the diester is hydrolyzed during the reaction to lose the molar balance of monomers, so that no polymer having a high degree of polymerization is formed.

In the present invention, the chlorine includes those derived from a component having a chlorine atom, obtained by hydrolysis of the component having a chlorine atom under prescribed conditions and dissociated under prescribed conditions, and those derived from a component having a chlorine atom and dissociated under prescribed conditions. Namely, the chlorine according to the present invention includes free chlorine ions, chlorine ions dissociated and present in the form of an inorganic acid such as hydrochloric acid, chlorine ions dissociated and present in the form of an inorganic salt such as sodium chloride and potassium chloride, and chlorine ions dissociated and derived from an organic chlorine compound such as phenyl chloroformate, which may be hydrolyzed. The chlorine concentration is determined by ion chromatography. Namely, the amount of the chlorine ions present after the pretreatment of a sample is determined.

The removal of the above impurities from the carbonic diester can be conducted by, e.g., (1) a process which comprises washing a carbonic diester with hot water or an aqueous weak-base solution, (2) a process which comprises adding urea to a carbonic diester and heat-melting the obtained mixture, or (8) a process which comprises adding a salt of an alkali or alkaline earth metal, for example, $Na_2CO_3$, $NaHCO_3$, $KH_2PO_4$ or $K_2HPO_4$, to a carbonic diester and distilling the obtained mixture in a vacuum.

The methods for measuring the impurities in the carbonic diester are described with respect to Examples of the present invention hereinafter.

The amount of the carbonic diester to be used is generally 0.90 to 1.50 mol, preferably 0.95 to 1.25 mol per mole of the dihydroxy compound.

If necessary, part of the carbonic diester may be replaced by a dicarboxylic acid or a dicarboxylic acid ester. In such a case, a copolyester carbonate is obtained. The present invention also includes such copolyester carbonates. Examples of the dicarboxylic acid and dicarboxylic acid ester include terephthalic acid, diphenyl terephthalate, isophthalic acid and diphenyl isophthalate. The amount of the dicarboxylic acid and dicarboxylic acid ester to be used is 50 mole % or below, preferably 80 mole % or below based on the sum of the amounts of the carbonic diester, the dicarboxylic acid and the dicarboxylic acid ester.

In the preparation of the branched (co)polycarbonate, a branching agent is used. The branching agent to be used in the present invention is a polyfunctional organic compound having at least three functional groups such as a hydroxyl group and a carboxyl group, preferably one having such a structure that the reaction of part of the functional groups does hoe affect the reactivity of the rest of the functional groups. Examples of the branching agent include polycarboxylic acids and derivatives thereof, such as trimellitic acid, trimellitic anhydride, triphenyl trimellitate, pyromellitic acid, pyromellitic anhydride and tetraphenyl pyromellitate; trishydroxyphenylalkanes such as 1,1,1-tris(4-hydroxyphenyl)ethane, 1,1,1-tris(4-hydroxy-3-methylphenyl)ethane. 1,1,1-tris(4-hydroxy-3,5-dimethylphenyl)ethane, 1,1,1-tris(3-chloro-4-hydroxyphenyl)ethane, 1,1,1-tris(3,5-dichloro-4-hydroxyphenyl)ethane, tris(4-hydroxyphenyl)ethane and tris(4-hydroxyphenyl)methane; and 1,4-bis(4',4"-dihydroxytriphenylmethyl)benzene, tetrakis(4-hydroxyphenyl)methane, 1-[α-methyl-α-(4'-hydroxyphenyl)ethyl] -4-[α', α'-bis(4"-hydroxyphenyl)ethyl]benzene and 1-[α,α-bis(4'-hydroxyphenyl)ethyl]-4-[α',α'-bis(4"-hydroxyphenyl)ethyl] benzene. These polyfunctional organic compounds may be used alone or as a mixture of two or more of them.

The amount of the branching agent to be used is $5 \times 10^{-4}$ to $2 \times 10^{-2}$ mol per mole of the dihydroxy compound.

The nitrogen-containing basic compound (a) to be used in the present invention as a catalyst is not particularly limited but may be any one so far as it is electron donative. Examples thereof include pyridine, 4-aminopyridine, 2-aminopyridine, 4-dimethylaminopyridine, 4-diethylaminopyridine, 4-pyrrolidinopyridine, 2-hydroxypyridine, 4-hydroxypyridine, 2-methoxypyridine, 4-methoxypyridine, picoline, pyrimidine, imidazole, 2-methylimidazole, 4-methylimidazole, 2-dimethylaminoimidazole, 2-methoxyimidazole, 2-mercaptoimidazole, pyrazole, aminoquinoline, benzimidazole, N,N-dimethylaniline, pyrrolidine, morpholine, N-methylmorpholine, piperidine, piperazine, 1,8-diazabicyclo[5.4.0]-7-undecene (DBU) and 1,5-diazabicyclo[4.3.0] -5-nonene (DBN). These nitrogen-containing basic compounds may be used alone or as a mixture of two or more of them.

In the present invention, a compound (b) containing an element selected from the group consisting of elements belonging to Groups I, II, IV and V of the periodic table may also be used as a catalyst. It does not matter whether this compound is organic or inorganic.

Elements belonging to Group I of the periodic table includes lithium, sodium and potassium. The compound containing a Group I element includes, for example, lithium hydroxide, lithium acetate, lithium hydrogencarbonate, lithium stearate, lithium borate, lithium borohydride, lithium benzoate, sodium hydroxide, sodium acetate, sodium hydrogencarbonate, sodium stearate, sodium borate, sodium borohydride, sodium benzoate, potassium hydroxide, potassium acetate, potassium hydrogen-carbonate, potassium stearate, potassium borate, potassium borohydride and potassium benzoate.

Elements belonging to Group IIa of the periodic table includes calcium, barium, magnesium and strontium, and those belonging to Group IIb of the periodic table include zinc and cadmium. The compound containing a Group II element includes, for example, calcium hydroxide, calcium acetate, calcium stearate, barium hydroxide, barium acetate, barium stearate, magnesium hydroxide, magnesium acetate, magnesium stearate, strontium hydroxide, strontium acetate, strontium stearate, zinc acetate, zinc oxalate, zinc phenylacetate, zinc chloride, zinc sulfate, zinc nitrate, zinc carbonate, zinc oxide, zinc hydroxide, zinc stearate, chromium zinc oxide, chromium copper zinc oxide, cadmium acetate, cadmium oxalate, cadmium oxide and cadmium stearate.

Elements belonging to Group IVa of the periodic table include titanium, zirconium and hafnuim. Elements belonging to Group IVb include silicon, germanium, tin and lead. The compound containing a Group IV element includes, for example, silicon oxide, silicon aluminum oxide ($SiO_2$—$Al_2O_3$), silicon magnesium oxide ($SiO_2$—MgO), germanium oxide, germanium hydroxide, stannous acetate, stannous oxalate, tin caprylate, stannous chloride, stannic chloride, stannous oxide, stannic oxide, tetraphenyltin, lead acetate, lead borate, lead citrate, lead hydroxide, lead oxide, lead phosphate, lead phthalate and lead stearate.

Elements belonging to Group Va of the periodic table include vanadium, niobium and tantalum. Elements belonging to Group Vb include antimony and bismuth. The compound containing a Group V element includes, for example, antimony acetate, antimony oxalate, triphenylantimony, antimony trioxide, antimony pentaoxide, triphenoxyantimony, trimethoxyantimony, triethoxyantimony, antimony trichloride, bismuth acetate, bismuth oxalate, triphenylbismuth, triphenoxybismuth, bismuth trioxide and bismuth trichloride.

According to the process of the present invention, the melt polycondensation of a dihydroxy compound with a carbonic diester is conducted with a nitrogen-containing basic compound (a) and/or a compound (b) containing an element selected from the group consisting of elements belonging to Groups I, II, IV and V of the periodic table as a catalyst(s). The nitrogen-containing basic compound (a) and the compound (b) containing an element selected from the group consisting of elements belonging to Groups I, II, IV and V of the periodic table may be used irrespective of each other as one kind of the compound or as a mixture of two or more kinds of them. Further, the compound (b) may be used as a catalyst system comprising a combination of a plurality of compounds containing the same element or different elements. In the present invention, compound (b') containing an element selected from the group consisting of elements belonging to Groups I, IIa, IVa and Va of the periodic table is preferably used as a catalyst.

The amount of the nitrogen-containing basic compound (a) to be used in the process according to the present invention may be within such a range that polycondensation can be effected sufficiently. For example, the amount of the nitrogen-containing basic compound (a) to be used is $10^{-7}$ to $10^{-1}$ mol, preferably $10^{-6}$ to $10^{-2}$ mol per mole of the dihydroxy compound. When the amount of the nitrogen-containing basic compound (a) to be used is less than $10^{-7}$ mol, a prolonged reaction at a temperature of as high as 220° to 300° C. will be necessary to prepare a (co)polycarbonate having a desired degree of polymerization, e.g., one having a weight-average molecular weight of a about 5,000 to 50,000, which is disadvantageous to the industrial preparation of (co)polycarbonate. On the contrary, when the amount exceeds $10^{-1}$ mol, the amount of residual catalyst in the resulting (co)polycarbonate composition, i.e., the reaction product, will be increased, whereby the properties of the (co)polycarbonate composition and the (co)polycarbonate are apt to be impaired.

Further, the amount of the compound (b) to be used is $10^{-8}$ to $10^{-3}$ mol, preferably $10^{-8}$ to $10^{-4}$ mol, per mole of the dihydroxy compound. When the amount of the compound (b) to be used is less than $10^{-8}$ mol, it will take a prolonged time to prepare a (co)polycarbonate having a desired degree of polymerization, which is disadvantageous to the industrial preparation of (co)polycarbonate. On the contrary, when the amount exceeds $10^{-3}$ mol, a branched structure due to a side reaction will be formed to an undesirable extent.

In the process according to the present invention, it is preferable that the melt polycondensation of a dihydroxy compound with a carbonic diester be conducted in the presence of a compound represented by the above general formulae (I) or (II).

The compound represented by the general formula (I) includes alkyl phenyl ethers such as methyl phenyl ether, ethyl phenyl ether, n-propyl phenyl ether, isopropyl phenyl ether, n-butyl phenyl ether, isobutyl phenyl ether, sec-butyl phenyl ether, tert-butyl phenyl ether, n-hexyl phenyl ether, cyclohexyl phenyl ether, pentyl phenyl ether, heptyl phenyl ether, octyl phenyl ether and ethyl-4-methylphenyl ether, and the compound represented by the general formula (II) includes diphenyl ethers such as diphenyl ether, 4,4'-dimethyldiphenyl ether, 4-methyldiphenyl ether, 4-ethyl-4'-methyldiphenyl ether and 4-ethyldiphenyl ether, though the compounds represented by the general formulae (I) and (II) are not limited by those described above. These compounds represented by the general formulae (I) or (II) may be used alone or as a mixture of two or more of them. When a catalyst having an alkali metal atom or an alkaline earth metal atom is not used, a compound represented by the general formulae (I) or (II) may not be necessitated.

The amount of the compound represented by the general formulae (I) or (II) to be used may be within such a range as not to impair the properties of the resulting (co)polycarbonate. For example, this amount is about $10^{-8}$ to $10^{-1}$ mol, preferably about $10^{7}$ to $10^{-2}$ mol, per mole of the dihydroxy compound. When the amount of the compound to be used is less than $10^{-8}$ mol, the side reaction depressing effect will be so little that an undesirable amount of a branched structure will be formed by a side reaction. On the contrary, when the amount exceeds $10^{-1}$ mol, the amount of the compound to be remain in the resulting (co)polycarbonate composition will increase, whereby the properties of the (co)polycarbonate composition and the (co)polycarbonate are apt to be impaired.

The transesterification is effected in the presence of preferably at least one compound selected from the group consisting of a boric acid, a borate and ammonium hydrogenphosphite, and more preferably, a boric acid and/or a borate, as an additive. The additives may be used for the purpose of preventing a (co)polycarbonate from lowering in its molecular weight to thereby improve its heat stability or protecting a (co)polycarbonate composition from discoloration in molding to thereby improve its heat stability.

The boric acid as an additive includes metaboric acid, orthoboric acid, tetraboric acid and so forth. Among them, orthoboric acid is preferred. Representative examples of the borate as an additive include triphenyl borate, trimethyl borate, triethyl borate, tributyl borate, tritolyl borate and trinaphthyl borate. Further, ammonium hydrogen-phosphite is also used as an aditive. The additives may be used alone or as a mixture of two or more of them.

The additive may be added before the beginning of the reaction, in the early stage of the reaction, in the middle stage of the reaction or after the completion thereof, and is preferably added before the beginning of the reaction or in the early stage of the reaction. The additive added to the reaction mixture neutralizes the basic catalyst, serving to improve the heat stability of the resultant (co)polycarbonate composition and the resultant (co)polycarbonate.

The amount of the additive to be used may be within such a range as not to impair the properties of the resulting (co)polycarbonate and the resulting (co)polycarbonate composition. The additive is used, for example, in an amount of about 0.01 to 500 mol, preferably 0.01 to 10 mol, based on 1 mol of the basic polymerization catalyst. When the amount is less than 0.01 mol, the resulting (co)polycarbonate and the resulting (co)polycarbonate composition will have little improvement in heat stability to lower the molecular weight of the (co)polycarbonate or to discolor during the processing thereof. While when it exceeds 500 mol, high-molecular-weight (co)polycarbonate will be liable to prepare, the molecular weight of the resulting (co)polycarbonate will lower an undesirable extent during molding and the resulting (co)polycarbonate composition will extent during molding.

Alternatively, the amount of the additive is preferably about 1 to 50 mol, still preferably about 1 to 10 mol, based on 1 mol of the catalyst used.

The boric acid or borate as the additive is used in such amount that the amount of the boron atom of the boric acid or borate is 0.01 to 500 mol, preferably 0.01 to 10 mol, based on 1 mol of the basic group of the nitrogen-containing basic compound (a) as the catalyst. The boric acid or borate is used in such an amount that the amount of the boron atom of the boric acid or borate is 0.01 to 500 mol, preferably 5 to 200 mol, based on 1 mol of the alkali metal or alkaline earth metal atom of the compound having an element belonging to Groups I or IIa of the periodic table as the catalyst. The boric acid or borate is used in such amount that the amount of the boron atom of the boric acid or borate is 0.01 to 500 mol based on 1 mol of the sum of the basic group of the nitrogen-containing basic compound and the alkali metal or alkaline earth metal atom of the compound having an element belonging to Groups I or IIa of the periodic table.

The ammonium hydrogenphosphite is used as an acidic substance in such amount that the amount of the phosphorus atom of the ammonium hydrogenphosphite is 0.01 to 500 mol based on 1 mol of the basic group of the nitrogen-containing basic compound as the catalyst. The ammonium hydrogenphosphite is used in such an amount that the amount of the phosphorus atom of the ammonium hydrogenphosphite is 0.01 to 500 mol based on 1 mol of the alkali metal or alkaline earth metal atom of the compound having an element belonging to Groups I or IIa of the periodic table as the catalyst. The ammonium hydrogenphosphite is used in such an amount that the amount of the phosphorus atom of the ammonium hydrogenphosphite is 0.01 to 500 mol based on 1 mol of the sum of the basic group of the nitrogen-containing basic compound and the alkali metal or alkaline earth metal atom of the compound having an element belonging to Groups I or IIa of the periodic table.

The transesterification may be conducted by any process which is conventionally employed in the melt polycondensation, for example, a process which comprises carrying out the reaction at about 80° to 250° C., preferably about 100° to 230° C. in an early stage, heating the resulting mixture while evacuating the reaction system, and finally carrying out the reaction at about 250° to 320° C. The degree of vacuum at the completion of the reaction is preferably, e.g., 0.3 Torr or below.

When such a transesterification is conducted, polycondensation proceeds smoothly to give a (co)polycarbonate composition mainly comprising a heat stable, high-molecular-weight (co)polycarbonate substantially free from any branched structure that might be formed by a side reaction, which is not discolored and is substantially free from chlorine. When the transesterification is conducted in the presence of a branching agent, a (co)polycarbonate composition mainly comprising a heat stable, high-molecular-weight (co)polycarbonate having a branched structure formed not by a side reaction but by using the branching agent.

EXAMPLES

The present invention will now be described in more detail with reference to the following Examples, which should not be considered to limit the scope of the present invention.

Various values shown in the following Examples were determined as follows:

(1) Limiting viscosity number $[\eta]$

The limiting viscosity number $[\eta]$ of a methylene chloride solution of each reaction mixture (reaction product) comprising mainly a (co)polycarbonate or each sheet (which was used in heat stability test) comprising mainly a (co)polycarbonate was determined at 20° C. with an Ubbellohde viscometer.

(2) Viscosity-average molecular weight (Mv)

The viscosity-average molecular weight (Mv) of the (co)polycarbonate was determined by calculation based on the limiting viscosity number $[\eta]$ determined as described above according to the following formula:

$$[\eta]=1.11\times10^{-4}\,(Mv)^{0.82}$$

(3) Branching parameter G

The limiting viscosity number $[\eta]$ of a test (co)polycarbonate and the limiting viscosity number $[\eta]_{lin}$ of a linear (co)polycarbonate having a weight-average molecular weight, which is determined by the light scattering method or the GPC method using a universal calibration curve, equal to that of the test (co)polycarbonate, are determined as described above. Then, the branching parameter G was calculated according the the formula $G=[\eta]/[\eta]_{lin}$.

(4) Total concentration ($M^+$) of alkali metal ions and alkaline earth metal ions The total concentration of alkali metal ions and alkaline earth metal ions was determined with an atomic absorption spectrometer (mfd. by Seiko Instruments. Inc., SAS/727).

(5) Hue

The YI of each sheet [50×50×2 mm (H-W-D)] prepared with each reaction mixture (reaction product) comprising mainly a (co)polycarbonate by the hot pressing quenching process was determined on a color difference meter (mfd. by Nippon Denshoku, NDJ-1001DP) before and after storage at 160° C. for 30 days in air.

(6) Chlorine concentration

A sample, i.e., a reaction mixture (reaction product), was baked with a crucible made of platinum to prepare ash. The ash was extracted with water and the extract (i.e., an aqueous solution containing chlorine ions) was subjected to ion chromatography by the use of Yokogawa Electric works, IC 100 (YOKOGAWA SAX-1) to determine the chlorine concentration.

(7) Terminal hydroxyl concentration

The amount of terminal hydroxyl groups of the (co)polycarbonate was determined by subjecting each reaction mixture (reaction product) comprising mainly a (co)polycarbonate to $^{13}$C-NMR spectroscopy according to the gated decoupling measurement mode and calculating the area ratio of the peak at 114.80 ppm to that at 129.50 ppm.

(8) Impurity contents of carbonic diester a) Method for determining phenyl salicylate, o-phenoxybenzoic acid and phenyl o-phenoxybenzoate content The content was determined by the use of a gas chromatograph (mfd. by Shimadzu Corporation, GC-14A).

b) Method for determining tin ion content

The content was determined with an atomic absorption spectrometer (mfd. by Shimadzu Corporation, AA-670 G) and a graphite furnaced analyzer (mfd. by Shimadzu Corporation, GFA-4A).

c) Method for determining chlorine content

A sample (5 g) was dissolved in 10 ml of toluene, followed by the addition of 10 ml of an eluent (an aqueous solution containing 2.8 mmol of $NaHCO_3$ and 2.25 mmol of $Na_2CO_3$) and 15 ml of highly deionized water in this order. The obtained mixture was shaken and then left to stand. The upper toluene layer formed was removed. The resulting aqueous phase was treated with C-18 SEP-PAK to be freed from contaminant toluene. The aqueous phase thus treated was subjected to ion chromatography (YOKOGAWA SAX-1) to determine the chlorine content.

d) Method for determining sodium ion content or iron ion content

The content was determined with an atomic absorption spectrometer (SAS-727 mfd. by Seiko Instruments, Inc.).

e) Method for determining copper ion content or phosphorus ion content

The content was determined with an inductively coupled plasma (ICP) emission spectrometer (mfd. by Shimadzu Corporation, ICPS-1000III).

f) Method for determining water content

The content was determined with a trace water measuring apparatus (mfd. by Mitsubishi Chemical Industries Ltd., CA-05).

Example A

This example relates to a branched (co)polycarbonate.

Example A-1

45.66 g (0.20 mol) of 2,2-bis(4-hydroxyphenyl)propane, 44.99 g (0.21 mol) of diphenyl carbonate having 1 ppm or below of chlorine, below 0.5 ppm of sodium ion, below 1 ppm of tin ion, below 0.5 ppm of iron ion and 50 ppm of water, 0.31 g ($1.0\times10^{-3}$ mol) of 1,1,1-tris(4-hydroxyphenyl)ethane and $1.2 \times 10^{-2}$ g ($2.0 \times 10^{-4}$ mol) of boric acid were fed into a flask having a capacity of 300 ml, followed by the addition of $4.8 \times 10^{-3}$ g ($4 \times 10^{-5}$ mol) of 4-dimethylaminopyridine as a catalyst. The air in the flask was purged with nitrogen gas and the contents in the flask was heated to 160° C. After melting the materials, the molten mixture was stirred at 160° C. under normal pressure for 30 minutes and thereafter gradually heated up to 240° C. while gradually evacuating the system to 5 Torr, whereby about 32 ml of phenol was distilled off. Then, the resulting system was further heated and evacuated to 270° C. and 0.2 Torr, respectively, and polycondensation was effected finally at 270° C. at 0.2 Torr for 1.5 hours, thus giving a colorless transparent reaction product comprising a polycarbonate.

Examples A-2 to A-6

Polycarbonates were prepared in the same manner as that of Example A-1 except that the materials other than 2,2-bis(4-hydroxyphenyl)propane and diphenyl carbonate fed were varied as follows: 0.15 g ($5.0 \times 10^{-4}$ mol) of 1,1,1-tris(4-hydroxyphenyl)ethane, $1.9 \times 10^{-2}$ g ($3.0 \times 10^{-4}$ mol) of boric acid, $4.8 \times 10^{-3}$ g ($4.0 \times 10^{-5}$ mol) of 4-dimethylaminopyridine and $1.2 \times 10^{-3}$ g ($4.0 \times 10^{-6}$ mol) of antimony trioxide were used in Example A-2; 0.72 g ($1.5 \times 10^{-3}$ mol) of α,α',α"-tris(4-hydroxyphenyl)-1,3,5-triisopropylbenzene, $5.4 \times 10^{-3}$ g ($5.0 \times 10^{-5}$ mol) of methyl phenyl ether, $3.1 \times 10^{-2}$ g ($5.0 \times 10^{-4}$ mol) of boric acid, $4.8 \times 10^{-3}$ g ($4.0 \times 10^{-5}$ mol) of 4-dimethylaminopyridine and $1.0 \times 10^{-5}$ g ($1 \times 10^{-7}$ mol) of potassium acetate in Example A-3; 0.46 g ($1.5 \times 10^{-3}$ mol) of 1,1,1-tris(4-hydroxyphenyl)ethane, $8.5 \times 10^{-3}$ g ($5.0 \times 10^{-5}$ mol) of diphenyl ether, $1.9 \times 10^{-2}$ g ($3.0 \times 10^{-4}$ mol) of boric acid, $5.9 \times 10^{-3}$ g ($4.0 \times 10^{4}$ mol) of 4-piperidinopyridine and $3.7 \times 10^{-4}$ g ($2.0 \times 10^{-6}$ mol) of zinc acetate in Example A-4; 0.31 g ($1.0 \times 10^{-3}$ mol) of 1,1,1-tris(4-hydroxyphenyl)ethane, $5.8 \times 10^{-3}$ g ($2.0 \times 10^{-5}$ mol) of triphenyl borate and $1.2 \times 10^{-3}$ g ($4.0 \times 10^{-6}$ mol) of antimony acetate in Example A-5; and 0.48 g ($1.0 \times 10^{-3}$ mol) of α,α',α"-tris(4-hydroxyphenyl)-1,3,5-triisopropylbenzene, $2.7 \times 10^{-3}$ g ($2.5 \times 10^{-5}$ mol) of methyl phenyl ether, $2.9 \times 10^{-3}$ g ($1.0 \times 10^{-5}$ mol) of triphenyl borate and $8.6 \times 10^{-5}$ g ($1 \times 10^{-6}$ mol) of lithium borate in Example A-6.

Referential Example A-1

The same procedure as that of Example A-3 was repeated except that no 1,1,1-tris(4-hydroxyphenyl)ethane was added. Thus, a reaction product comprising a polycarbonate was obtained.

Comparative Examples A-1 and A-2 and Referential Example A-2

45.66 g (0.20 mol) of 2,2-bis(4-hydroxyphenyl)propane and 44.99 g (0.21 mol) of diphenyl carbonate having 1 ppm or below of chlorine, below 0.5 ppm of sodium ion, below 1 ppm of tin ion, below 0.5 ppm of iron ion and 50 ppm of water were fed into a flask having a capacity of 300 ml, followed by the addition of $4.0 \times 10^{-4}$ g ($4.0 \times 10^{-6}$ mol) of potassium acetate (Comparative Example A-1), $6.5 \times 10^{-4}$ g ($2.0 \times 10^{-6}$ mol) of lead acetate (Referential Example A-2) or $1.6 \times 10^{-4}$ g ($4.0 \times 10^{-6}$ mol) of sodium hydroxide (Comparative Example A-2). The resulting mixtures were treated in the same manner as that of Example A-1 to give reaction products each comprising a polycarbonate.

Table 1 shows the limiting viscosity number, weight average molecular weight, branching parameter (G value), total concentration (M⁺) of alkali metal ions and alkaline earth metal ions and hue (YI) which were determined as described above.

The amount of chlorine in each reaction product obtained was also examined as described above. The amounts of chlorine in the reaction products were in the range of 1 to 2 ppm. Further, the amounts of terminal hydroxyl groups of the polycarbonates obtained were in the range of 20 mole % or below.

TABLE 1

|  | Limiting viscosity number [η] (dl/g) | Wt.-av. mol. wt. Mw | Braching parameter G | Total concn. of alkali metal ions and alkaline earth metal ions [M⁺] (ppm) | Hue (YI) | After thermal treatment at 160° C. for 30 days | |
|---|---|---|---|---|---|---|---|
|  |  |  |  |  |  | Wt.-av. mol. wt. Mw | Hue (YI) |
| Ex. A-1 | 0.34 | 30,200 | 0.67 | 0.1 | 1.2 | 28,200 | 12 |
| Ex. A-2 | 0.35 | 28,300 | 0.72 | 0.1 | 1.5 | 26,500 | 13 |
| Ex. A-3 | 0.45 | 49,700 | 0.59 | 0.1 | 1.7 | 46,000 | 16 |
| Ex. A-4 | 0.50 | 58,300 | 0.58 | 0.1 | 1.6 | 53,600 | 14 |
| Ex. A-5 | 0.39 | 37,700 | 0.64 | 0.1 | 1.4 | 35,300 | 11 |
| Ex. A-6 | 0.43 | 43,500 | 0.63 | 0.1 | 1.5 | 40,300 | 14 |
| Ref. Ex. A-1 | 0.55 | 34,500 | 0.97 | 0.1 | 1.7 | 32,200 | 17 |
| Comp. Ex. A-1 | 0.54 | 54,200 | 0.66 | 2.4 | 2.3 | 15,700 | 35 |
| Ref. Ex. A-2 | 0.47 | 29,700 | 0.93 | 0.1 | 1.8 | 15,500 | 28 |
| Comp. Ex. A-2 | 0.49 | 39,400 | 0.77 | 1.5 | 2.5 | 19,800 | 32 |

As will be understood from the results given in Table 1. the polycarbonate compositions, i.e., the reaction produces, prepared in the Examples are free from discoloration and the polycarbonates prepared in the Examples have degrees of branching suitable for the production of a hollow molded article. Further, it can be understood from the results of Referential Example A-1 that the polycarbonate prepared in Example A-3 is substantially free from any branched structure which might otherwise be formed by a side reaction. Furthermore, when left to stand in the air at 160° C. for 30 days, the polycarbonates prepared in the Examples barely suffered from lowering in their molecular weight, which reveals that they have excellent heat stability, while those prepared in Comparative Examples suffered from a remarkable lowering in their molecular weight. When left to stand in the air at 160° C. for 30 days, the reaction products prepared in the Examples barely suffered from discoloration, which reveals that they have excellent heat stability, while those prepared in Comparative Examples suffered from discoloration.

Example B

This example relates to a linear (co)polycarbonate.

Example B-1

45.66 g (0.20 mol) of 2,2-bis(4-hydroxyphenyl)propane, 44.99 g (0.21 mol) of diphenyl carbonate having 1 ppm or below of chlorine, below 0.5 ppm of sodium ion, below 1 ppm of tin ion, below 0.5 ppm of iron ion and 50 ppm of water, and $1.2 \times 10^{-2}$ g ($2.0 \times 10^{-4}$ mol) of boric acid were fed into a flask having a capacity of 800 ml, followed by the addition of $4.8 \times 10^{-3}$ g ($4 \times 10^{-5}$ mol) of 4-dimethylaminopyridine as a catalyst. The air in the flask was purged with nitrogen gas and the contents in the flask was heated to 160° C. After melting the materials, the molten mixture was stirred at 160° C. under normal pressure for 30 minutes and thereafter gradually heated up to 240° C. while gradually evacuating the system to 5 Torr, whereby about 82 ml of phenol was distilled off. Then, the resulting system was further heated and evacuated to 270° C. and 0.2 Torr, respectively, and polycondensation was effected finally at 270° C. at 0.2 Torr for 1.5 hours, thus giving a colorless transparent reaction product comprising a polycarbonate.

or below of chlorine, below 0.5 ppm of sodium ion, below 1 ppm of tin ion, below 0.5 ppm of iron ion and 50 ppm of water were fed into a flask having a capacity of 300 ml, followed by the addition of $2.0 \times 10^{-4}$ g ($2.0 \times 10^{-6}$ mol) of potassium acetate (Comparative Example B-1), $3.2 \times 10^{-4}$ g ($2.0 \times 10^{-6}$ mol) of calcium acetate (Comparative Example B-2) or $1.6 \times 10^{-4}$ g ($4.0 \times 10^{-6}$ mol) of sodium hydroxide (Comparative Example B-3). The resulting mixtures were treated in the same manner as that of Example B-1 to give reaction products each comprising a polycarbonate.

Table 2 shows the limiting viscosity number, weight average molecular weight, branching parameter (G value), total concentration ($M^+$) of alkali metal ions and alkaline earth metal ions and hue (YI) which were determined as described above.

The amount of chlorine in each reaction product obtained was also examined as described above. The amounts of chlorine in the reaction products were each in the range of 1 to 2 ppm. Further, the amounts of terminal hydroxyl groups of the polycarbonates obtained were in the range of 20 mole % or below.

TABLE 2

| | Limiting viscosity number [η] (dl/g) | Wt.-av. mol. wt. Mw | Braching parameter G | Total concn. of alkali metal ions and alkaline earth metal ions [$M^+$] (ppm) | Hue (YI) | After thermal treatment at 160° C. for 30 days | |
|---|---|---|---|---|---|---|---|
| | | | | | | Wt.-av. mol. wt. Mw | Hue (YI) |
| Ex. B-1 | 0.49 | 29,600 | 0.96 | 0.1 | 1.2 | 27,600 | 8 |
| Ex. B-2 | 0.52 | 31,200 | 0.98 | 0.1 | 1.3 | 29,100 | 11 |
| Ex. B-3 | 0.60 | 39,700 | 0.93 | 0.1 | 1.8 | 36,300 | 19 |
| Ex. B-4 | 0.45 | 27,400 | 0.95 | 0.1 | 1.5 | 25,900 | 13 |
| Ex. B-5 | 0.61 | 40,500 | 0.93 | 0.1 | 1.7 | 37,700 | 16 |
| Ex. B-6 | 0.48 | 28,800 | 0.97 | 0.1 | 1.3 | 26,900 | 15 |
| Comp. Ex. B-1 | 0.54 | 41,200 | 0.82 | 1.3 | 2.1 | 18,600 | 30 |
| Comp. Ex. B-2 | 0.44 | 26,800 | 0.94 | 1.5 | 1.8 | 16,300 | 26 |
| Comp. Ex. B-3 | 0.49 | 39,400 | 0.77 | 1.5 | 2.5 | 19,800 | 32 |

Examples B-2 to B-6

Polycarbonates were prepared in the same manner as that of Example B-1 except that materials other than 2,2-bis(4-hydroxyphenyl)propane and diphenyl carbonate fed were varied as follows: $1.9 \times 10^{-2}$ g ($3.0 \times 10^{-4}$ mol) of boric acid, $4.8 \times 10^{-3}$ g ($4.0 \times 10^{-5}$ mol) of 4-dimethylaminopyridine and $1.2 \times 10^{-3}$ g ($4.0 \times 10^{-6}$ mol) of antimony trioxide were used in Example B-2; $5.4 \times 10^{-3}$ g ($5.0 \times 10^{-5}$ mol) of methyl phenyl ether, $3.1 \times 10^{-2}$ g ($5.0 \times 10^{-4}$ mol) of boric acid, $4.8 \times 10^{-3}$ g ($4.0 \times 10^{-5}$ mol) of 4-dimethylaminopyridine and $1.0 \times 10^{-5}$ g ($1 \times 10^{-7}$ mol) of potassium acetate in Example B3; $1.9 \times 10^{-2}$ g ($3.0 \times 10^{-4}$ mol) of boric acid and $5.9 \times 10^{-3}$ g ($4.0 \times 10^{-5}$ mol) of 4-piperidinopyridine in Example B-4; $1.7 \times 10^{-3}$ g ($1.0 \times 10^{-5}$ mol) of diphenyl ether, $5.8 \times 10^{-3}$ g ($2.0 \times 10^{-5}$ mol) of triphenyl borate, $5.9 \times 10^{-3}$ g ($4.0 \times 10^{-5}$ mol) of 4-piperidinopyridine and $8.6 \times 10^{-5}$ g ($1 \times 10^{-6}$ mol) of lithium borate in Example B-5; and $2.9 \times 10^{-3}$ g ($1.0 \times 10^{-5}$ mol) of triphenyl borate and $1.2 \times 10^{-3}$ g ($4.0 \times 10^{-6}$ mol) of antimony acetate in Example B-6.

Comparative Examples B-1 to B-3

45.66 g (0.20 mol) of 2,2-bis(4-hydroxyphenyl)propane and 44.99 g (0.21 mol) of diphenyl carbonate having 1 ppm As will be understood from the results given in the Table 2, the polycarbonate compositions, i.e., the reaction products, prepared in Examples are free from discoloration and the polycarbonates prepared in the Examples are substantially free from any branched structure. Further, when left to stand in the air at 160° C. for 30 days, the polycarbonates prepared in the Examples barely suffered from lowering in their molecular weight, which reveals that they have excellent heat stability, while those prepared in the Comparative Examples suffered from a remarkable lowering in their molecular weight. Furthermore, when left to stand in the air at 160° C. for 30 days, the reaction products prepared in the Examples barely suffered from discoloration, which reveals that they have excellent heat stability, while those prepared in the Comparative Examples suffered from discoloration.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What we claim is:

1. A (co)polycarbonate product comprising a (co)polycarbonate only containing no more than 10 ppm of chlorine ion and no more than 1 ppm of alkali metal ion and alkaline earth metal ion as impurities, said (co)polycarbonate having a limiting viscosity number η of 0.2 to 1.0 dl/g, said limiting viscosity number η being determined by a solution made up of the (co)polycarbonate in methylene chloride at 20° C., a total terminal hydroxyl group content of no more than 20 mole % and a branching parameter G of 0.1 to 1.0.

2. The (co)polycarbonate product according to claim 1, wherein said (co)polycarbonate is prepared by a melt transesterification reaction between a dihydroxy compound and a carbonic diester, the carbonic diester being used in an amount of 0.9 to 1.50 mol per mole of the dihydroxy compound, in the presence of a transesterification catalyst of $10^{-7}$ to $10^{-1}$ mol of a nitrogen-containing basic compound or $10^{-8}$ to $10^{-3}$ mol of an element selected from Groups I, II, IV or V of the periodic table.

3. A process for preparing a (co)polycarbonate only containing no more than 10 ppm of chlorine ion and no more than 1 ppm of alkali metal ion and alkaline earth metal ion as impurities, said (co)polycarbonate having a limiting viscosity number η of 0.2 to 1.0 dl/g, said limiting viscosity number η being determined by a solution made up of the (co)polycarbonate in methylene chloride at 20° C., a total terminal hydroxyl group content of no more than 20% and a branching parameter G of 0.1 to 1.0, said process comprising a step of reacting a dihydroxy compound with a carbonic diester in a melt transesterification reaction, the carbonic diester being used in an amount of 0.9 to 1.50 mol per mole of the dihydroxy compound, in the presence of a transesterification catalyst of $10^{-7}$ to $10^{-1}$ mol of a nitrogen-containing basic compound or $10^{-8}$ to $10^{-3}$ mol of an element selected from Groups I, II, IV or V of the periodic table 4. A (co)polycarbonate product comprising a (co)polycarbonate only containing from 3.1 to 10 ppm of chlorine ion, not more than 1 ppm of an alkali metal ion and an alkaline earth metal ion and not more than 1 ppm of iron ion, said (co)polycarbonate having a limiting viscosity number η of 0.2 to 1.0 dl/g, said limiting viscosity number η being determined by a solution made up of the (co)polycarbonate in methylene chloride at 20° C., a total terminal hydroxyl group content of no more than 20 mole % and a branching parameter G of 0.1 to 1.0.

5. The (co)polycarbonate product according to claim 1, wherein the (co)polycarbonate has a branching parameter G of 0.8 to 1.0.

6. The (co)polycarbonate product according to claim 1, wherein the (co)polycarbonate has a branching parameter G of exceeding 0.9 and up to 1.0.

7. The (co)polycarbonate composition according to claim 1, wherein the (co)polycarbonate has a branching parameter G of 0.1 to 0.9.

8. The (co)polycarbonate composition mainly comprising a (co)polycarbonate according to claim 1, wherein the (co)polycarbonate has a branching parameter $G=[\eta]/[\eta]_{lin}$ of 0.8 to 1.0.

9. The (co)polycarbonate product according to claim 2, wherein the carbonic diester satisfies at least one factor selected from the group consisting of:

(factor-1) the carbonic diester is substantially free from phenyl salicylate, o-phenoxybenzoic acid and phenyl o-phenoxybenzoate, (factor-2) the carbonic diester is substantially free from tin ion, and (factor-3) the carbonic diester is substantially free from methyl phenyl carbonate.

10. The process according to claim 3, wherein the melt transesterification is effected in the presence of a polyfunctional organic compound having at least three functional groups as a branching agent in an amount of 0.05 to 2% by mole based on the amount of the dihydroxy compound.

11. The process according to claim 3, wherein the melt transesterification is effected in the presence of at least one compound selected from the group consisting of compounds represented by the following general formulae (I) or (II):

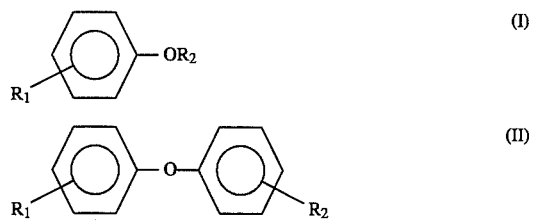

wherein $R_1$ and $R_2$ are each a hydrogen atom or a linear or branched alkyl group having 1 to 8 carbon atoms.

12. The process according to claim 10, wherein the melt transesterification is effected in the presence of at least one compound selected from the group consisting of compounds represented by the following general formulae (I) or (II):

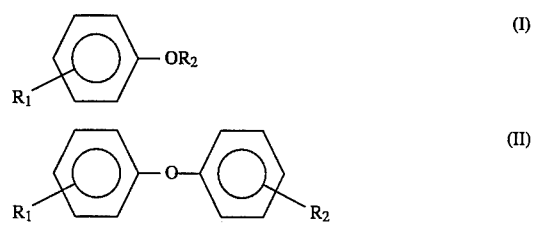

wherein $R_1$ and $R_2$ are each a hydrogen atom or a linear or branched alkyl group having 1 to 8 carbon atoms.

13. The process according to claim 3, wherein the melt transesterification is effected in the presence of at least one compound selected from the group consisting of a boric acid, a borate and ammonium hydrogenphosphite.

14. The process according to claim 10, wherein the melt transesterification is effected in the presence of at least one compound selected from the group consisting of a boric acid, a borate and ammonium hydrogenphosphite.

15. The process according to claim 3, wherein the melt transesterification is effected in the presence of at least one compound selected from the group consisting of a boric acid and a borate.

16. The process according to claim 10, wherein the melt transesterification is effected in the presence of at least one compound selected from the group consisting of a boric acid and a borate.

17. The process according to claim 3, wherein the carbonic diester satisfies at least one factor selected from the group consisting of:

(factor-1) the carbonic diester is substantially free from phenyl salicylate, o-phenoxybenzoic acid and phenyl o-phenoxybenzoate, (factor-2) the carbonic diester is substantially free from tin ion, and (factor-3) the carbonic diester is substantially free from methyl phenyl carbonate.

18. The process according to claim 10, wherein the carbonic diester satisfies at least one factor selected from the group consisting of:
- (factor-1) the carbonic diester is substantially free from phenyl salicylate, o-phenoxybenzoic acid and phenyl o-phenoxybenzoate,
- (factor-2) the carbonic diester is substantially free from tin ion, and
- (factor-3) the carbonic diester is substantially free from methyl phenyl carbonate.

* * * * *

UNITED STATES PATENT AND TRADEMARK OFFICE
CERTIFICATE OF CORRECTION

PATENT NO. : 5,475,079
DATED : December 12, 1995
INVENTOR(S) : Yoshimichi OKANO et al It is certified that error appears in the above-indentified patent and that said Letters Patent is hereby corrected as shown below:

```
On the title page, Item [30], line 1;  change "5-10220"
                                        to ---5-102280---.
Col. 21, line 52;  change "composition" to ---product---.
Col. 21, line 55;  delete "mainly comprising".
         line 56;  delete "a (co)polycarbonate".
         line 57;  delete "=[η]/[η]lin".
```

Signed and Sealed this

Eleventh Day of June, 1996

Attest:

BRUCE LEHMAN

*Attesting Officer*    Commissioner of Patents and Trademarks